Figure 1:
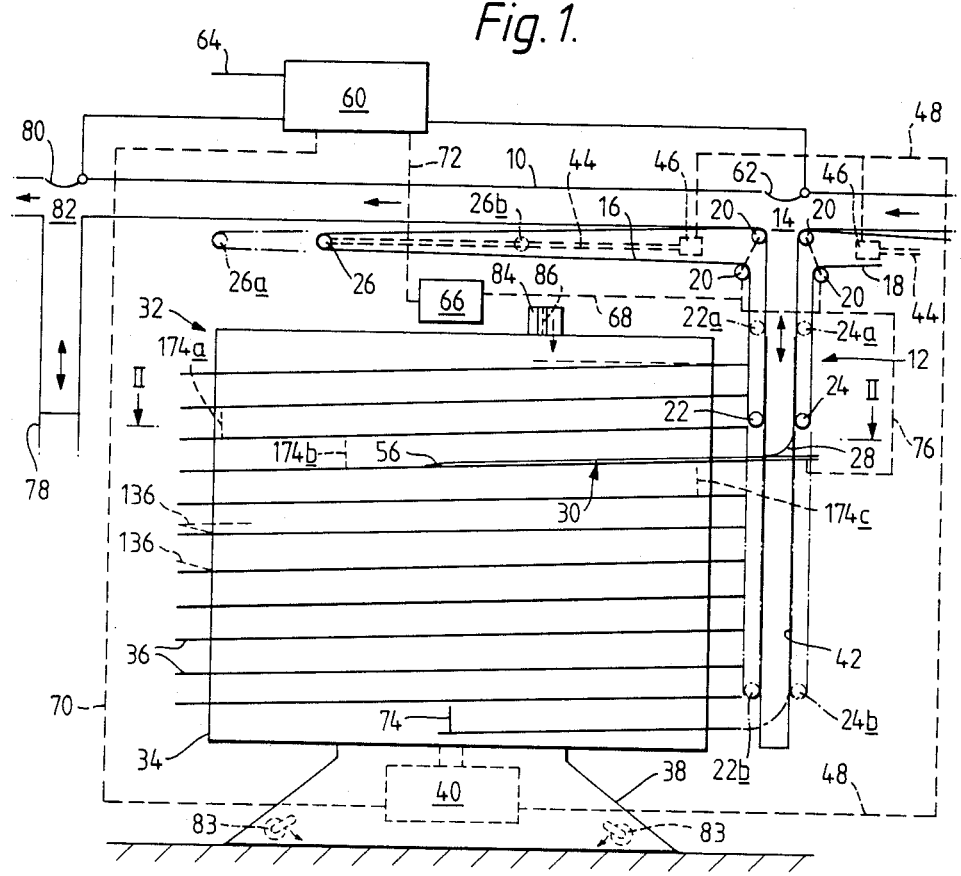

United States Patent [19]

Hinchcliffe

[11] Patent Number: 4,872,543
[45] Date of Patent: Oct. 10, 1989

[54] CONVEYOR SYSTEM FOR ROD-LIKE ARTICLES

[75] Inventor: Dennis Hinchcliffe, Orpington, England

[73] Assignee: Molins PLC, Milton Keynes, England

[21] Appl. No.: 41,197

[22] Filed: Apr. 22, 1987

[30] Foreign Application Priority Data

Apr. 23, 1986 [GB] United Kingdom ............... 8609894

[51] Int. Cl.⁴ ............................................ B65G 37/00
[52] U.S. Cl. .................................. 198/347; 198/594; 198/778
[58] Field of Search ............... 198/778, 347, 588, 594; 131/282, 283

[56] References Cited

U.S. PATENT DOCUMENTS

| | | | |
|---|---|---|---|
| 3,869,115 | 3/1975 | Barkley | 198/347 X |
| 4,042,094 | 8/1977 | Schmermund | 198/347 |
| 4,099,608 | 7/1978 | McCombie | 198/347 |
| 4,120,391 | 10/1978 | Molins et al. | 198/347 |
| 4,170,285 | 10/1979 | Hinchcliffe | 198/347 |
| 4,254,858 | 3/1981 | Seragnoli | 198/347 |
| 4,280,611 | 7/1981 | Molins et al. | 198/347 |
| 4,344,445 | 8/1982 | Seragnoli | 131/283 X |
| 4,349,096 | 9/1982 | Thamerus | 198/347 |

FOREIGN PATENT DOCUMENTS

| | | | |
|---|---|---|---|
| 2323226 | 11/1974 | Fed. Rep. of Germany | 198/347 |
| 2133759 | 8/1984 | United Kingdom | 131/282 |
| 2135951 | 9/1984 | United Kingdom | 198/347 |

Primary Examiner—Robert J. Spar
Assistant Examiner—Lyle K. Kimms
Attorney, Agent, or Firm—Antonelli, Terry & Wands

[57] ABSTRACT

A conveyor system for a multi-layer stream of cigarettes or the like includes a buffer reservoir (32) and a variable length elevator (12) for transferring cigarettes between a main conveyor (10) and the reservoir. The elevator (12) has a movable lower end (22,24) carrying a transfer conveyor (30) which rises and falls with the state of fill of the reservoir (32). The reservoir (32) comprises a rotatable drum (34) carrying an helical track (36). Drive devices (40,46) for the drum (34) and for the movable end (22,24) of the elevator (12) are synchronized and the conveying speed of the elevator is adjusted to compensate for movement of its lower end (22,24).

29 Claims, 2 Drawing Sheets

CONVEYOR SYSTEM FOR ROD-LIKE ARTICLES

This invention relates to a conveyor system for rod-like articles, particularly articles of the tobacco industry such as cigarettes and cigarette filter rods.

It is common in the tobacco industry to transport cigarettes and similar rod-like articles as a substantially continuous stream in multi-layer stack formation with the articles arranged transverse to the direction of conveyance. During such transportation it is known to provide a variable capacity buffer reservoir for the articles, so as to allow longer periods of operation of an upstream delivery device or downstream receiving device in the event of a malfunctioning of one of the devices or if their rates of operation differ for any other reason. A buffer reservoir and its manner of operation are disclosed in British patent specification No. 1299174, to which reference is directed. The present invention particularly, but not exclusively, relates to transfer of articles to and from a variable capacity buffer reservoir.

According to one aspect of the invention a conveyor system for rod-like articles comprises means defining a path for rod-like articles in multi-layer stack formation, said path having at least one movable end, said movable end including means for transferring articles between said path and receiving means at different locations, conveyor means for moving articles on said path, and means for moving said movable end to allow transfer of articles between the path and the receiving means. The term "receiving means" should not be taken to imply that transfer is necessarily in a direction from the path to the receiving means; transfer may be in a direction from the receiving means to the path and/or vice versa. The conveyor means may be reversible. The path may be of variable length and said moving means may be arranged to vary the length of the path. Conveniently the path has a vertical component of direction and said fixed end of said path may be located at a junction with a conveyor linking an article delivery device to an article receiving device.

In a preferred arrangement the system may include said store, which may comprise a variable capacity buffer reservoir. The reservoir may be arranged so that said transfer occurs at different positions according to the state of fill of the reservoir. The reservoir may include reservoir conveyor means and drive means for the reservoir conveyor means. Said drive means is preferably synchronised with a drive means for said moving means.

Said conveyor means is preferably arranged to move articles on said path at a rate which corresponds to the rate at which articles are transferred to or from the receiving means. Where the receiving means includes reservoir conveyor means and drive means for said reservoir conveyor means, said conveyor means is preferably driven at the same rate as said reservoir conveyor means. Control means may be provided to adjust the speed of said conveyor means to compensate for movement of said moving means so that the flow rate of articles on said path is correct even when the end of said path is moving.

In a preferred arrangement the receiving means comprises a variable capacity reservoir in the form of a generally cylindrical or drum-like member having an helical track for storing the articles in multi-layer stack formation. Preferably the drum-like member has a vertical axis and said path defining means includes a vertical guide member adjacent the periphery of the drum. Thus the conveyor means may comprise a variable length reversible elevator carrying at its lower (movable) end transfer means, which may comprise substantially horizontal conveyor means, which may cooperate with the helical track of the drum at any level. The drum-like member may be rotated to transfer articles between the track and the elevator and as the reservoir progressively fills (or empties) the elevator rises (or falls) as the length of the stream on the track around the drum-like member changes.

The path defining means preferably comprises spaced means defining opposite sides of the path. Said spaced means preferably comprises parallel members. The path defining means may include said conveyor means and may, for example, comprise spaced opposed conveyor means, which may include one or more endless band conveyors and/or one or more pairs of laterally spaced endless conveyors. Particularly where said path includes a vertical portion, said conveyor means preferably includes means, e.g. spaced protrusions, for increasing traction on the conveyed articles.

According to another aspect of the invention a conveyor system for rod-like articles comprises means defining a path for rod-like articles in multi-layer stack formation, said path having a fixed end and a movable end, said movable end including means for transferring articles between said path and a store, reversible conveyor means for moving articles on said path, and means for moving said movable end to allow transfer of articles between the path and the store.

According to another aspect of the invention a conveyor system for rod-like articles comprises reversible conveyor means for rod-like articles in multi-layer stack formation, a variable capacity reservoir for articles, the conveyor means including transfer means by which articles are transferred between the conveyor means and the reservoir, and means for moving the transfer means in accordance with the quantity of articles within the reservoir. The conveyor means may include a variable path length for articles. The moving means may be synchronised with driven means for moving articles in the reservoir. The conveyor means may include opposed elevating conveyors, at least one of which is of variable operative length.

According to a further aspect of the invention a conveyor system for rod-like articles comprises an article delivery device, an article receiving device, conveying means for conveying articles in multi-layer stack formation from the article delivery device and towards the article receiving device, a variable capacity buffer reservoir, said reservoir having at least two transfer positions, and reversible transfer conveyor means for conveying articles between said conveying means and each of said transfer positions, and means for moving said transfer reservoir means between said positions. Said moving means may be arranged to move one end of said transfer conveyor means. In a preferred arrangement said transfer conveyor means is of variable length and includes a portion having a vertical component.

In a preferred arrangement the reservoir has a plurality of closely spaced transfer positions such that in effect, said moving means may continuously move said conveyor means during transfer. Thus the possible transfer positions may be infinitely closely spaced. In a preferred arrangement the reservoir comprises an helical path and said transfer conveyor means is arranged so that it is moved gradually in an axial direction relative to said path as articles are conveyed on said path by a rotary movement relative to said axis. Preferably the drive means for providing said rotary and axial movements are synchronised.

In each of the aspects of the invention mentioned above the variable capacity reservoir and said path defining means (or said reversible conveyor means or said transfer conveyor means) may be separable so that a full reservoir may be removed for replacement by an empty reservoir, or vice versa. Articles may be retained in the reservoir and, if necessary, in the path defining means (or reversible conveyor means or transfer conveyor means) by use of suitable gates. Such gates are disclosed in British patent specifications Nos. 1573425, 2066761, and 2157253, to which reference is directed for details.

Reference is also directed to U.S. Pat. No. 4,813,527, issued Mar. 21, 1989, the disclosure of which is hereby incorporated herein in its entirety. Said specification relates to a system including a variable length elevator: features disclosed (including claimed) in said specification, (particularly, but not exclusively, relating to the elevator) are hereby incorporated herein as applicable to the system of the present application.

Figures 2, 3:
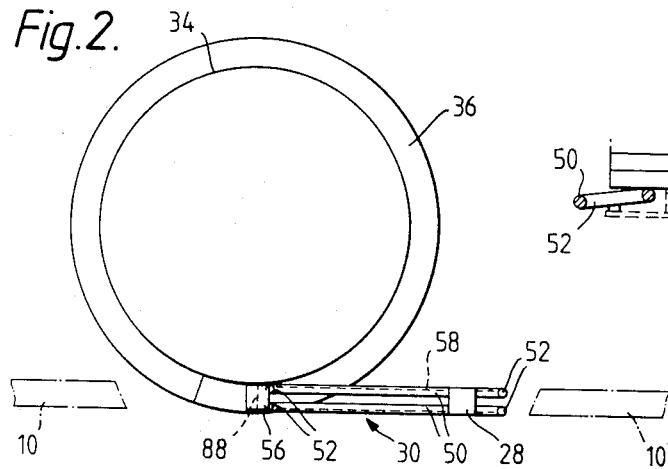
Figure 4:
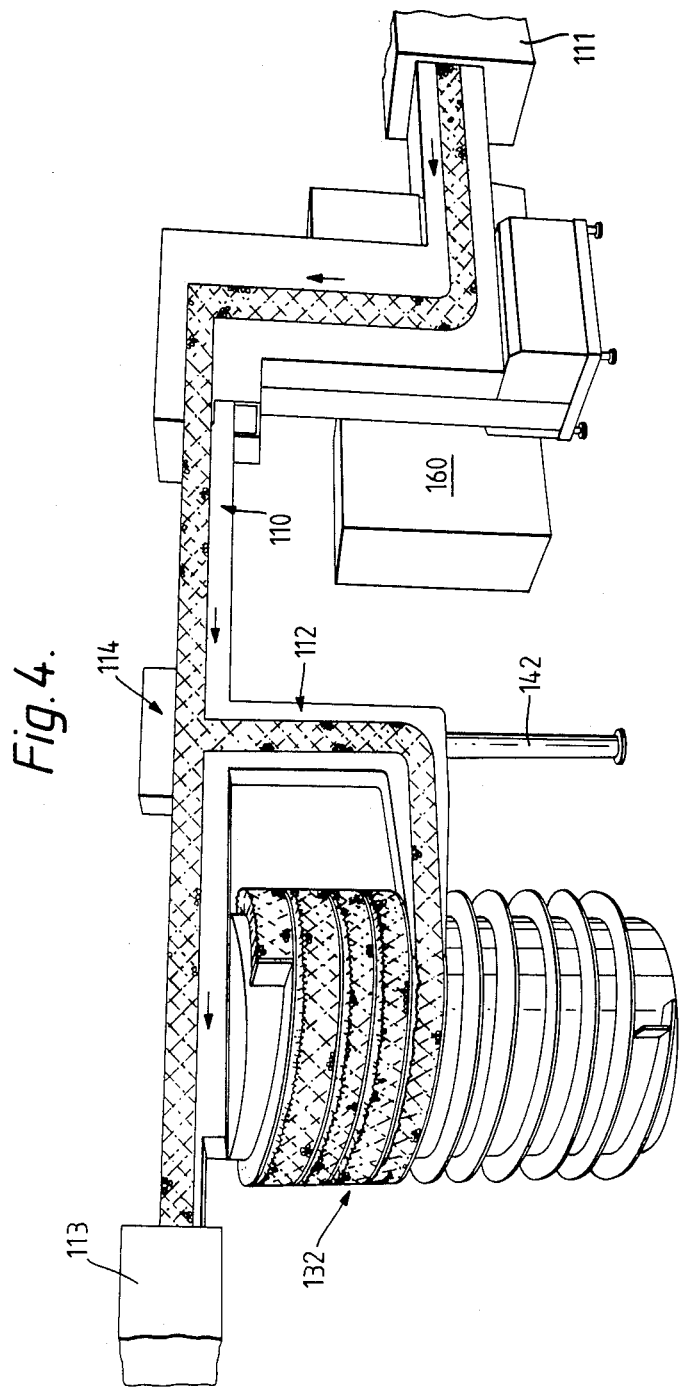

The invention will be further described, by way of example only, with reference to the accompanying diagrammatic drawings, in which:

FIG. 1 is a side view of part of a conveyor system for cigarettes, including a reservoir, FIG. 2 is a sectional view (to a different scale) on the line II—II in FIG. 1., FIG. 3 is a detailed sectional view of part of the system of FIG. 1, and FIG. 4 is a perspective view of another conveyor system for cigarettes.

The conveyor system shown in FIG. 1 comprises an elevated generally horizontal conveyor 10 for conveying cigarettes in multi-layer stack formation from one or more cigarette making or filter cigarette assembling machines (not shown) towards one or more cigarette packing machines (not shown). The conveyor 10 includes endless band conveyors supporting the cigarettes. A reversible elevator 12 extends downwards from a fixed end at a junction 14 on the conveyor 10, and is of variable length, comprising endless bands 16, 18, which pass around fixed pulleys 20, and movable pulleys 22, 24, and 26. At the lower end of the elevator is a curved guide 28 and a generally horizontal conveyor 30 arranged to transfer a stream of cigarettes between the elevator 12 and a drum reservoir 32.

The reservoir 32 comprises a thin-walled cylindrical drum 34 and a helical support track 36 fixed to the drum. The drum 34 could be constructed of metal, e.g. aluminium alloy, and the track 36 may be of a similar metal spot welded to the drum. The track 36 could comprise annular sections welded together as explained with reference to FIG. 3 of British patent specification No. 2082996. Alternatively, the drum 34 could comprise filament wound polyester or other plastics material and the track 36 be made from an extruded plastics material and be adhesively secured to the drum. The drum 34 is rotatably mounted on a stand 38 and is rotatable by means of a drive 40.

The elevator 12 is movable from an upper position, in which the pulleys 22, 24 occupy positions 22a, 24a and the pulley 25 occupies position 26a, and a lower position, in which the corresponding positions of the respective pulleys are 22b, 24b, and 26b. The paths of the pulleys 22, 24 and that of the cigarettes in the elevator 12 are defined by static guide members generally indicated by the reference 42. The curved guide 28 and the adjacent end of the conveyor 30 are connected for movement with the pulleys 22, 24 and are therefore similarly guided by the member 42. The conveyor 30 may be cantilevered from a position adjacent the guide 42 but is preferably partially supported by the track 36.

The height of the elevator 12, i.e. The positions of pulleys 22, 24, is determined by the positions of the pulleys (only one of which is shown in FIG. 1). These positions are determined by lead screws 44 connected to the pulleys 26 and to transmissions 46 linked by a transmission line 48 to the drive 40 for the drum 34.

As shown in FIGS. 2 and 3, the conveyor 30 comprises a pair of endless round bands 50 which pass around inclined end pulleys 52 so that the inner runs of the bans can support the cigarettes 54 (FIG. 3). The pulleys 52 are inclined so that overall height of the conveyor 30 is low: this allows it to extend between adjacent turns of the helical track 36. At the end of the conveyor 30 which rests on the track 36 a small downwardly inclined deadplate 56 aids transfer of cigarettes between the track 36 and the bands 50. The pulleys 52 and deadplate 56 are connected and supported by a structure 58.

The reservoir 32 is loaded and unloaded with cigarettes from the conveyor 10 according to perceived differences between supply and demand in the system of which the conveyor 10 forms a part. Such loading and unloading may be under control of a unit 60 (which may include a microprocessor) which receives signals from a sensor 62 at the junction 14 and/or receives further signals from other parts of the system (e.g. relating to relative speeds of the making and packing machines connected to conveyor 10) along a line 64. The unit 60 may control the reservoir 32 so that it buffers a maker/-packer system in a way substantially similar to that of Molins OSCAR and as disclosed with reference to British patent specification No. 1299174.

Drive of the bands 16, 18 to convey cigarettes in the elevator 12 and to or from the reservoir 32 is achieved by a drive motor 66 connected by a transmission 68 to pulleys 20 for each band. The drives 40 and 66 are respectively connected to the control unit 60 by signal lines 70, 72 and the unit is programmed so that the speed of drive 66 is automatically adjusted to compensate for movement of bands 16, 18 due to movement of the pulleys 22, 24 under action of the lead screws 44.

In the position shown in full lines in FIG. 1 the reservoir 32 is approximately two thirds full, with all of the track 36 below the conveyor 30 occupied by cigarettes up to an end member 74 connected to the track. It is clear, therefore, that filling of the reservoir starts with the elevator 12 at its lowermost position, i.e. with the pulleys 22, 24 in positions 22b, 24b. As filling continues the drive 40 rotates the drum 34 and track 36 in a clockwise direction as viewed in FIG. 2. The transmission 46, 48 between the lead screws 44 and the drive 40 is such that the pulleys 22, 24 are raised at precisely the rate required to ensure that the curved guide 28 and the conveyor 30 remain correctly engaged with the track 36 as the reservoir 32 is progressively filled. If filling continues until the pulleys 22, 24 reach the positions 22a, 24a the reservoir 32 is full and the drive 40 will be stopped. During filling the drive 66 moves the bands 16, 18 at a speed appropriate to that of the drum 34, i.e. so that the cigarette flow rate in the elevator 12 is the same as that on the track 36.

Unloading the reservoir 32 is a reversal of filling. The drive 40 rotates the drum 34 in a counter-clockwise direction as viewed in FIG. 2 and the drive 66 moves the conveyors 16, 18 upwards. Note that for use as an elevator the conveyors 16, 18 are preferably formed with projections or other formations adapted to aid traction on the cigarettes. In this respect reference is directed to British patent specification No. 1453191. As the reservoir 32 empties, the pulleys 22, 24 descend and when they reach the positions 22b, 24b the reservoir is empty and the drives 40 and 66 are stopped (by the control unit 60).

During movement of the drum 34 and conveyors 16, 18 the conveyor 30 is also driven, at the same speed as the track 36. Drive to the conveyor 30 is preferably by way of an extension 76 of the transmission 68 leading from the drive 66. Alternatively, the pulleys 52 could be driven directly by a drive connection on one of the pulleys 22, 24.

It may be desirable to prevent relatively rapid fluctuations between loading and unloading, so that osciliation backwards and forwards of the drum 34 is avoided. This could be achieved by arranging a smaller, simpler reservoir 78 connected to the conveyor 10 so that the main reservoir 32 is operated only when the reservoir 78 is unable to cope. Such an arrangement would automatically reduce the occurrence of operations of the main reservoir 32. The reservoir 78 may be controlled by the unit 60 according to a sensor 80 at a junction 82 above the reservoir and also by the signal on the line 64. The reservoir 78 could be substantially similar to that disclosed in British patent specification No. 1453192. The reservoir 78 need not be vertical: in particular it could be substantially horizontal, e.g. by rearranging the junction 82 so that the path of conveyor 10 downstream of the junction extends vertically downwards for a short distance and so that the reservoir 78 extends horizontally from the junction.

FIG. 4 shows a reservoir system which is generally similar to that shown in FIG. 1 and comprises a conveyor 110 extending from a making machine 111 to a cigarette packing machine 113. The conveyor 110 has a junction 114 from which a variable height elevator 112 leads to a drum reservoir 132. The elevator 112 has a guide post 142 along which its lower end may rise and fall. Note that the reservoir 13 fills from the top unlike the reservoir 32. Operation of the system is under control of a unit 160.

A variable height elevator similar to the elevator 12 or 112 could be used for transfer of cigarettes to storage regions which differ from the drum reservoir 32 or 132. In particular the elevator 12 could be used to supply a series of substantially horizontal straight separate reservoir conveyors. Referring to FIG. 1, each of the slats 36 (which, for this purpose, may be regarded as horizontal) may be regarded as comprising the upper run of a straight conveyor band so that each constitutes a separate reservoir. Clearly, in this case, each slat would require an end wall similar to the end wall 74, for example as indicated by the dotted lines 174a, 174b and 174c in FIG. 1. Assuming filling from the top, the conveyor band associated with wall 174a would be full, that associated with the wall 174b is being filled, and that associated with the wall 174c is empty. The walls 174a, 174b, and 174c are not present, of course, when the track 36 defines a helical path as described earlier with reference to FIG. 1.

The track 36 could be inclined relative to the surface of the drum 34 so as to compensate for tip build-up when filter cigarettes are being stored. Thus, where the filter tipped ends of filter cigarettes are stored adjacent the surface of the drum 34 the slats could be inclined upwardly, as indicated at 136 in FIG. 1. Alternatively, or additionally, the drum 34 need not be right cylindrical, and could comprise a conical frustum.

It may be noted that in the system shown in FIG. 1 it is not necessary for both pulleys 22 and 24 to rise and fall as the position of transfer between the reservoir 32 and the elevator 12 changes. It is necessary for the pulley 22, guide 28 and conveyor 30 to change position but it is quite possible for the pulley 24 to remain in the position 24b, that part of the band below the position of transfer having no effect on the cigarettes. In that case, of course, the lead screw 44 and transmission 46 for the band 18 would not be required.

The variable height elevator 12 may be used for other purposes where it is required to change the position of transfer to or from a conveyor. In particular, the elevator may extend upwardly as well as downwardly from a main conveyor, and may supply rod-like articles at a variable height to a reservoir where the receiving positions of the articles are less well defined than in the reservoir 32. For example, the elevator 12 could supply articles to an open topped bin or tray and be arranged to carry a sensor at its lower end which would rise as the height of the level of articles in the bin increased. In this case the arrangement would have considerable similarities with that disclosed in said British patent specification No. 2165812.

By provision of gates or other suitable cigarette retaining means (e.g. as disclosed in said British patent specification No. 1573425), it is possible to separate the reservoir 32 or 132 or any other reservoir or storage region from the elevator 12 or 112, thereby providing a so-called "open loop" facility. Clearly, in such case it would be preferable for the reservoir 32 or 132 to be adapted for transportation, e.g. by providing wheels instead of or additional to (as indicated at 83 in FIG. 1) the stand 38. In FIG. 1 a mechanism 84, carried by the drum 34, is indicated for inserting a pair of gates 86 into the cigarette stream when the reservoir 32 is full, to allow separation. After insertion, one gate 86 retains the end of the stream of cigarettes on the drum 34 and the other gate 86 retains the end of the stream on the conveyor 30. For this latter purpose, as shown in FIGS. 2 and 3, the plate 56 (or support structure 58) is provided with means 88 (e.g. a slot) for receiving and holding a gate 86 inserted by the mechanism 84.

I claim:

1. A conveyor system for rod-like articles, comprising means defining a path for rod-like articles in multi-layer stack formation, said path having at least one movable end, said movable end including means for transferring articles in a first direction between said movable end of said path and receiving means at different locations, said transferring means and said receiving means being arranged so that articles may be reversibly transferred in multi-layer stack formation between said movable end and said receiving means without substantial change in said multi-layer stack formation, conveyor means for moving articles on said path, and means for moving said movable end in a second direction, different from said first direction, between said different locations to allow transfer of articles between the path and the receiving means at said different locations.

2. A conveyor system as claimed in claim 1 wherein the path is of variable length and the moving means includes means for varying the length of the path.

3. A conveyor system as claimed in claim 1, wherein the conveyor means is reversible.

4. A conveyor system as claimed in claim 2, wherein the path includes a fixed end located at a junction with a conveyor linking an article delivery device to an article receiving device.

5. A conveyor system as claimed in claim 1, including drive means for said conveyor means, drive means for said moving means, and control means for adjusting the speed of said conveyor means to compensate for movement of said moving means so as to maintain a required flow rate on said path to or from said receiving means.

6. A conveyor system as claimed in claim 1, including drive means for said receiving means and drive means for said moving means, said drive means for said receiving means and said drive means for said moving means being synchronised.

7. A conveyor system as claimed in claim 1, wherein the receiving means comprises a store for rod-like articles.

8. A conveyor system as claimed in claim 7, wherein the store comprises a variable capacity buffer reservoir.

9. A conveyor system as claimed in claim 8, including means for transferring articles to or from the reservoir, said transferring means being located at different positions according to the state of fill of the reservoir.

10. A conveyor system as claimed in claim 9, wherein the reservoir comprises a drum-like member having a helical track for storing articles in multi-layer stack formation.

11. A conveyor system as claimed in claim 10, wherein the drum-like member has a generally vertical axis and said path defining means includes a generally vertical guide member adjacent to the periphery of said member.

12. A conveyor system as claimed in claim 11, wherein said movable end comprises a generally horizontal path portion arranged to cooperate with said track on said drum-like member.

13. A conveyor system as claimed in claim 2, wherein the path defining means comprises spaced means defining opposite sides of the path.

14. A conveyor system as claimed in claim 2, wherein the path defining means includes said conveyor means.

15. A conveyor system as claimed in claim 14, wherein said path defining means includes opposed substantially parallel endless band conveyor means.

16. A conveyor system as claimed in claim 2, wherein said conveyor means includes means for increasing traction on conveyed articles.

17. A conveyor system as claimed in claim 1, further comprising means for inserting article retaining means between said receiving means and said path to allow separation of said receiving means and said path defining means.

18. A conveyor system for rod-like articles, comprising means defining a first path for rod-like articles in multi-layer stack formation, means defining a second path for rod-like articles in multi-layer stack formation, said second path extending helically around an axis, said first path having a fixed end and a movable end, said movable end including means for reversibly transferring articles between said first path and said second path, reversible conveyor means for moving articles on said first path, and means for moving said movable end to allow transfer of articles between the first and second paths at different locations spaced in a direction parallel to said axis.

19. A conveyor system for rod-like articles, comprising reversible conveyor means for rod-like articles in multi-layer stack formation, a variable capacity reservoir for articles, the conveyor means including transfer means by which articles are transferred between the conveyor means and the reservoir, means for moving the transfer means in accordance with the quantity of articles within the reservoir, and means for inserting article retaining means between said reservoir and said conveyor means to allow separation of said reservoir and said conveyor means.

20. A conveyor system as claimed in claim 19, wherein the conveyor means includes a variable path length for articles.

21. A conveyor system as claimed in claim 19, wherein the reservoir includes driven means for moving articles in the reservoir, further including means for synchronising said driven means and said moving means.

22. A conveyor system for rod-like articles, comprising reversible conveyor means for rod-like articles in multi-layer stack formation, a variable capacity reservoir for articles, the conveyor means having a variable path length for articles and including transfer means by which articles are reversibly transferred between the conveyor means and the reservoir, means for moving the transfer means in accordance with the quantity of articles within the reservoir, wherein the conveyor means includes opposed elevating conveyors, at least one of which is of variable operative length.

23. A conveyor system for rod-like articles, comprising an article delivery device, an article receiving device, conveying means for conveying articles in multi-layer stack formation from the article delivery device and towards the article receiving device, a variable capacity buffer reservoir, said reservoir having at least two transfer positions, and reversible transfer conveyor means for conveying articles in multi-layer stack formation between said conveying means and each of said transfer positions, and means for moving one end of said transfer conveyor means between said positions, wherein said transfer conveyor means is of variable length.

24. A conveyor system as claimed in claim 23, wherein the reservoir has a plurality of closely spaced transfer positions.

25. A conveyor system for rod-like articles, comprising an article delivery device, an article receiving device, conveying means for conveying articles in multi-layer stack formation from the article delivery device and towards the article receiving device, a variable capacity buffer reservoir having a plurality of closely spaced transfer positions, and reversible transfer conveying means for conveying articles between said conveying means and each of said transfer positions, and means for moving said transfer conveyor means between said positions, wherein the reservoir comprises an helical path and said transfer conveyor means is arranged to move in an axial direction relative to said path as articles are conveyed on said path by a rotary movement relative to the axis of said helical path.

26. A conveyor system as claimed in claim 25, including synchronised drive means for providing rotary movement of articles around said helical path and movement of said transfer conveyor means in said axial direction.

27. A conveyor system as claimed in claim 24, wherein the reservoir has discrete transfer positions associated with separate portions of said reservoir.

28. A conveyor system as claimed in claim 27, wherein said portions comprise generally horizontally extending reversible conveyors.

29. A conveyor system as claimed in claim 19, wherein said reservoir is removable, for replacement by another reservoir.

* * * * *